US011505657B2

(12) United States Patent
Kim et al.

(10) Patent No.: US 11,505,657 B2
(45) Date of Patent: *Nov. 22, 2022

(54) SYSTEM AND ROTATING BLADE UNIT FOR PREPARING SILICA AEROGEL

(71) Applicant: LG CHEM, LTD., Seoul (KR)

(72) Inventors: Ye Hon Kim, Daejeon (KR); Dong Kwon Lee, Daejeon (KR); Jong Ku Lee, Daejeon (KR); Je Kyun Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 226 days.

This patent is subject to a terminal disclaimer.

(21) Appl. No.: 15/755,513

(22) PCT Filed: Mar. 7, 2017

(86) PCT No.: PCT/KR2017/002447
§ 371 (c)(1),
(2) Date: Feb. 26, 2018

(87) PCT Pub. No.: WO2017/164541
PCT Pub. Date: Sep. 28, 2017

(65) Prior Publication Data
US 2018/0237596 A1   Aug. 23, 2018

(30) Foreign Application Priority Data
Mar. 24, 2016 (KR) .................... 10-2016-0035565

(51) Int. Cl.
*C08J 3/12* (2006.01)
*C01B 33/158* (2006.01)
(Continued)

(52) U.S. Cl.
CPC .................. *C08J 3/12* (2013.01); *B01J 19/00* (2013.01); *B02C 18/18* (2013.01); *B02C 19/06* (2013.01);
(Continued)

(58) Field of Classification Search
CPC . C01B 33/152; C01B 33/1585; C01B 33/158; C08J 2383/04; C08J 3/12;
(Continued)

(56) References Cited

U.S. PATENT DOCUMENTS 3,131,072 A   4/1964   Taulli
3,895,087 A   7/1975   Ottinger et al.
(Continued)

FOREIGN PATENT DOCUMENTS

CN   1164222   11/1997
CN   1241952   1/2000
(Continued)

OTHER PUBLICATIONS

XP-002782924, Database WPI Week 200578, AN2005-762993, Thomson Scientific—Summary of Application No. JP20040126923. published as JP2005305336 (2017).
(Continued)

*Primary Examiner* — Francisco W Tschen
*Assistant Examiner* — Elisa H Vera
(74) *Attorney, Agent, or Firm* — Dentons US LLP

(57) ABSTRACT

The system for preparing silica aerogel according to the present invention comprises a raw material supply part transferring at least one raw material of de-ionized water, water glass, a surface modifier, an inorganic acid, and an organic solvent to a mixing part, the mixing part mixing the raw materials transferred from the raw material supply part to produce silica wet gel, a drying part drying the silica wet gel to produce the silica aerogel, a recovery part recovering
(Continued)

a portion of the vaporized raw material of the raw materials used in at least one of the mixing part and the drying part, and a heat transfer part transferring heat to at least one of the mixing part and the drying part, wherein the system further comprises a pulverizing part that pulverizes the raw material from the row material supply part to the mixing part.

6 Claims, 1 Drawing Sheet

(51) Int. Cl.
　　*B01J 19/00*　　　　(2006.01)
　　*B02C 18/18*　　　　(2006.01)
　　*B02C 19/06*　　　　(2006.01)
　　*C08J 3/075*　　　　(2006.01)
　　*B01F 33/80*　　　　(2022.01)
(52) U.S. Cl.
　　CPC ........ *C01B 33/158* (2013.01); *C01B 33/1585* (2013.01); *C08J 3/075* (2013.01); *C08J 2383/02* (2013.01); *C08J 2383/04* (2013.01)
(58) Field of Classification Search
　　CPC ........ C08J 3/075; C08J 2383/02; B01J 19/00; B02C 18/18; B02C 19/06
　　USPC .......................................................... 366/317
　　See application file for complete search history.

(56) References Cited

U.S. PATENT DOCUMENTS

| | | |
|---|---|---|
| 5,789,075 A | 8/1998 | Frank et al. |
| 5,789,495 A | 8/1998 | Burns et al. |
| 5,955,140 A | 9/1999 | Smith et al. |
| 5,962,539 A | 10/1999 | Perrut et al. |
| 6,068,882 A | 5/2000 | Ryu |
| 6,319,852 B1 | 11/2001 | Smith et al. |
| 6,989,123 B2 | 1/2006 | Lee et al. |
| 7,399,439 B2 | 7/2008 | Lee et al. |
| 7,780,890 B2 | 8/2010 | Lee et al. |
| 8,137,651 B2 | 3/2012 | Yeo |
| 9,834,446 B2 | 12/2017 | Kim et al. |
| 9,862,614 B2 | 1/2018 | Oh et al. |
| 10,294,111 B2 | 5/2019 | Kim et al. |
| 10,336,621 B2 | 7/2019 | Kim et al. |
| 2001/0034375 A1 | 10/2001 | Schwertfeger et al. |
| 2002/0092938 A1* | 7/2002 | Huang .................... B02C 13/14 241/19 |
| 2002/0094426 A1 | 7/2002 | Stepanian et al. |
| 2004/0120876 A1* | 6/2004 | Meyer ................ C01B 33/1585 423/335 |
| 2005/0046086 A1 | 3/2005 | Lee et al. |
| 2005/0167891 A1 | 8/2005 | Lee et al. |
| 2005/0192366 A1 | 9/2005 | Ou et al. |
| 2005/0192367 A1 | 9/2005 | Ou et al. |
| 2006/0032953 A1* | 2/2006 | Kruse ..................... B02C 23/12 241/40 |
| 2006/0125158 A1 | 6/2006 | Rouanet et al. |
| 2006/0199455 A1 | 9/2006 | Stepanian et al. |
| 2006/0286813 A1 | 12/2006 | Meredith et al. |
| 2007/0148435 A1 | 6/2007 | Meredith et al. |
| 2007/0154379 A1 | 7/2007 | Nakanishi et al. |
| 2008/0034968 A1 | 2/2008 | Nodberg et al. |
| 2008/0069753 A1 | 3/2008 | Floess et al. |
| 2008/0081014 A1 | 4/2008 | Ahn et al. |
| 2008/0093016 A1 | 4/2008 | Lee et al. |
| 2008/0292889 A1 | 11/2008 | Harvey et al. |
| 2008/0311398 A1 | 12/2008 | Bauer et al. |
| 2009/0229032 A1 | 9/2009 | Stepanian et al. |
| 2009/0247655 A1 | 10/2009 | Kim et al. |
| 2010/0119432 A1 | 5/2010 | Yeo |
| 2010/0172815 A1 | 7/2010 | Park et al. |
| 2010/0204355 A1 | 8/2010 | Leventis et al. |
| 2010/0247897 A1 | 9/2010 | Leventis et al. |
| 2011/0000370 A1 | 1/2011 | Norberg et al. |
| 2011/0223329 A1 | 9/2011 | Meredith et al. |
| 2011/0240907 A1 | 10/2011 | Sharma et al. |
| 2012/0025127 A1 | 2/2012 | Yeo et al. |
| 2012/0171488 A1 | 7/2012 | Yeo et al. |
| 2012/0225003 A1 | 9/2012 | Joung et al. |
| 2012/0244040 A1 | 9/2012 | Joung et al. |
| 2012/0305683 A1* | 12/2012 | Yurievich ........... B02C 19/0018 241/39 |
| 2013/0106008 A1 | 5/2013 | Ahn et al. |
| 2013/0189521 A1 | 7/2013 | Fukuju et al. |
| 2013/0296596 A1 | 11/2013 | Suh et al. |
| 2014/0183290 A1* | 7/2014 | Xiao ....................... B02C 13/09 241/31 |
| 2014/0287641 A1 | 9/2014 | Steiner, III |
| 2015/0065590 A1 | 3/2015 | Rhine et al. |
| 2015/0069156 A1* | 3/2015 | Lee ........................ B02C 19/063 241/39 |
| 2015/0225630 A1 | 8/2015 | Hosoi et al. |
| 2016/0115685 A1 | 4/2016 | Bonnardel et al. |
| 2016/0199849 A1* | 7/2016 | Wada ................... B02C 18/146 425/375 |
| 2016/0258153 A1 | 9/2016 | Koebel et al. |
| 2016/0264427 A1 | 9/2016 | Oh et al. |
| 2016/0280557 A1 | 9/2016 | Kim et al. |
| 2017/0074449 A1 | 3/2017 | Rhine et al. |
| 2017/0305749 A1 | 10/2017 | Jeon et al. |
| 2018/0002181 A1 | 1/2018 | Kim et al. |
| 2018/0002182 A1 | 1/2018 | Jeon et al. |
| 2018/0010726 A1 | 1/2018 | Kim et al. |
| 2018/0193825 A1 | 7/2018 | Kim et al. |
| 2018/0194634 A1 | 7/2018 | Kang et al. |
| 2018/0208474 A1 | 7/2018 | Kim et al. |
| 2018/0305215 A1 | 10/2018 | Kim et al. |
| 2018/0370809 A1 | 12/2018 | Lee et al. |
| 2019/0062169 A1 | 2/2019 | Kim et al. |
| 2019/0135645 A1 | 5/2019 | Kim et al. |
| 2019/0194027 A1 | 6/2019 | Kim et al. |

FOREIGN PATENT DOCUMENTS

| | | |
|---|---|---|
| CN | 1749214 | 3/2006 |
| CN | 1839024 | 9/2006 |
| CN | 1888302 | 1/2007 |
| CN | 101132856 | 2/2008 |
| CN | 101450852 | 6/2009 |
| CN | 101517012 | 8/2009 |
| CN | 101646622 | 2/2010 |
| CN | 101691227 | 4/2010 |
| CN | 101844771 | 9/2010 |
| CN | 102317209 | 1/2012 |
| CN | 102557577 | 7/2012 |
| CN | 102674374 | 9/2012 |
| CN | 103118979 | 5/2013 |
| CN | 103771428 | 5/2014 |
| CN | 103818912 | 5/2014 |
| CN | 104030301 | 9/2014 |
| CN | 104961135 | 10/2015 |
| EP | 2231789 B1 | 2/2012 |
| EP | 2722311 | 4/2014 |
| EP | 2722311 A2 | 4/2014 |
| EP | 2813338 A1 | 12/2014 |
| EP | 3216762 A1 | 9/2017 |
| EP | 3257812 A1 | 12/2017 |
| JP | H10-70121 | 3/1998 |
| JP | H10-236817 | 9/1998 |
| JP | H11-28353 | 2/1999 |
| JP | 2002-256170 | 9/2002 |
| JP | 2005305336 | 11/2005 |
| JP | 2007-519780 | 7/2007 |
| JP | 2007-524528 | 8/2007 |
| JP | 2007-524739 | 8/2007 |
| JP | 2008-195851 | 8/2008 |
| JP | 2011-190551 | 9/2011 |
| JP | 2014-051643 | 3/2014 |
| JP | 2016-017255 | 2/2016 |
| KR | 10-1999-0009158 | 2/1999 |

(56) References Cited

FOREIGN PATENT DOCUMENTS

| | | |
|---|---|---|
| KR | 10-0385829 | 10/2003 |
| KR | 10-2008-0084241 | 9/2008 |
| KR | 10-2008-0093772 | 10/2008 |
| KR | 10-0909732 | 7/2009 |
| KR | 10-2010-0010350 | 2/2010 |
| KR | 10-2010-0053350 | 5/2010 |
| KR | 10-2010-0090989 | 8/2010 |
| KR | 10-2010-0133268 | 12/2010 |
| KR | 10-2011-0082379 | 7/2011 |
| KR | 10-2011-0125773 | 11/2011 |
| KR | 10-2011-0126381 | 11/2011 |
| KR | 10-1082982 | 11/2011 |
| KR | 10-1105436 | 1/2012 |
| KR | 10-2012-0012836 | 2/2012 |
| KR | 10-2012-0030791 | 3/2012 |
| KR | 10-2012-0070948 | 7/2012 |
| KR | 10-1199958 | 11/2012 |
| KR | 10-2013-0123942 | 11/2013 |
| KR | 10-2013-0128365 | 11/2013 |
| KR | 10-2014-0005177 | 1/2014 |
| KR | 10-2014-0050867 | 4/2014 |
| KR | 10-2014-0146814 | 12/2014 |
| KR | 10-1506096 | 3/2015 |
| KR | 10-2015-0089319 | 8/2015 |
| KR | 10-2015-0090320 | 8/2015 |
| KR | 10-2015-0093063 | 8/2015 |
| KR | 10-2015-0093122 | 8/2015 |
| KR | 10-2015-0093123 | 8/2015 |
| KR | 10-1789371 | 10/2017 |
| WO | 1996/006808 | 3/1996 |
| WO | 2005/003476 | 1/2005 |
| WO | 2005/110919 | 11/2005 |
| WO | 2008038935 | 4/2008 |
| WO | 2008/117995 | 10/2008 |
| WO | 2008/143384 | 11/2008 |
| WO | 2009/033065 | 3/2009 |
| WO | 2010/080237 | 7/2010 |
| WO | 2010/143902 | 12/2010 |
| WO | 2012/044052 | 4/2012 |
| WO | 2014-198931 | 12/2014 |
| WO | 2015014813 | 2/2015 |

OTHER PUBLICATIONS

Aravind et al, "Mesoporous silica-alumina aerogels with high thermal pore stability through hybrid sol-gel route followed by subcritical drying," Microporous and Mesoporous Materials 96: 14-20 (2006).
Aravind et al, "Nonsupercritically Dried Silica-Alumina Aerogels-Effect of Gelation pH," Journal of American Ceramic Society 91(4): 1326-1328 (2008).
Aravind et al., "Ambient pressure drying: a successful approach for the preparation of silica and silica based mixed oxide aerogels," Journal of Sol-Gel Science and Technology, 54: 105-117 (2010).
Kartal and Erkey, "Surface modification of silica aerogels by hexamethyldisilazane-carbon dioxide mixtures and their phase behavior," Journal of Supercritical Fluids 53: 115-120 (2010).
Bhagat et al, "A cost-effective and fast synthesis of nanoporous SiO2 aerogel powders using water-glass via ambient pressure drying route, "Solid State Sciences 9: 628-635 (2007).
Bhagat et al., "Superhydrophobic silica aerogel powders with simultaneous surface modification, solvent exchange and sodium ion removal from hydrogels," Microporous and Mesoporous Materials 112: 504-509 (2008).
Bhagat et al., "Textural properties of ambient pressure dried water-glass based silica aerogel beads: One day synthesis," Microporous and Mesoporous Materials 96: 237-244 (2006).
Cho et al, "A Study on the Extraction of Monasil PCA using Liquid CO2," Korean Chem. Eng. Res. 50(4): 684-689 (2012). English Language Abstract included.
Dorcheh and Abbasi, "Silica aerogel; synthesis, properties and characterization," J. Mat. Proc. Tech. 199: 10-26 (2008).
Hong et al., "Synthesis of spherical silica aerogel powder by emulsion polymerization technique," J. Ceram. Proc. Res. 13(Special 1): s145-s148 (2012).
Kwon et al, "Ambient-dried silica aerogel doped with TiO2 powder for thermal insulation," Journal of Materials Science 35: 6075-6079 (2000).
Lee et al., "Synthesis of silica aerogels from waterglass via new modified ambient drying," Journal of Materials Science 37(11): 2237-2241 (2002).
Purwanto, D. and Y. Wulandari, "Effects of precursors concentration on surface area of silica aerogels synthesized via an ambient pressure drying method," The 1st International Seminar on Fundamental & Application of Chemical Engineering, pp. A017-1 to A017-4 (Nov. 3-4, 2010, Bali—Indonesia).
Yang et al., "Porous organic-inorganic hybrid aerogels based on bridging acetylacetonate," Microporous and Mesoporous Materials 187: 108-113 (2014).
Rao et al., "Effect of precursors, methylation agents and solvents on the physiochemical properties of silica aerogels prepared by atmospheric pressure drying method," Journal of Non-Crystalline Solids 296: 165-171 (2001).
Rao et al., "Effect of protic solvents on the physical properties of the ambient pressure dried hydrophobic silica aerogels using sodium solicate precursor," Journal of Porous Materials 15: 507-512 (2008).
Ren et al., "Fabrication of silica aerogel micro cylinder for ICF target," Journal of Functional Materials 37: 834-836 (2006). English Language Abstract included on last page.
Schwertfeger et al., "Hydrophobic waterglass based aerogels without solvent exchange or supercritical drying," Journal of Non-Crystalline Solids 225: 24-29 (1998).
Sinko et al., "Nanostructure of Gel-Derived Aluminosilicate Materials," Langmuir 24: 949-956 (2008).
Sinko, "Influence of Chemical Conditions on the Nanoporous Structure of Silicate Aerogels," Materials 3: 704-740 (2010).
Wei et al, "Rich photoluminescence emission of SnO2—SiO2 composite aerogels prepared with a co-fed precursor sol-gel process," Journal of the Chinese Institiute of Chemical Engineers 38: 477-481 (2007).
Xu et al, "Preparation and characterization of silica-titania aerogel-like balls by ambient pressure drying," Journal of Sol-Gel Science and Technology 41: 203-207 (2007).

* cited by examiner

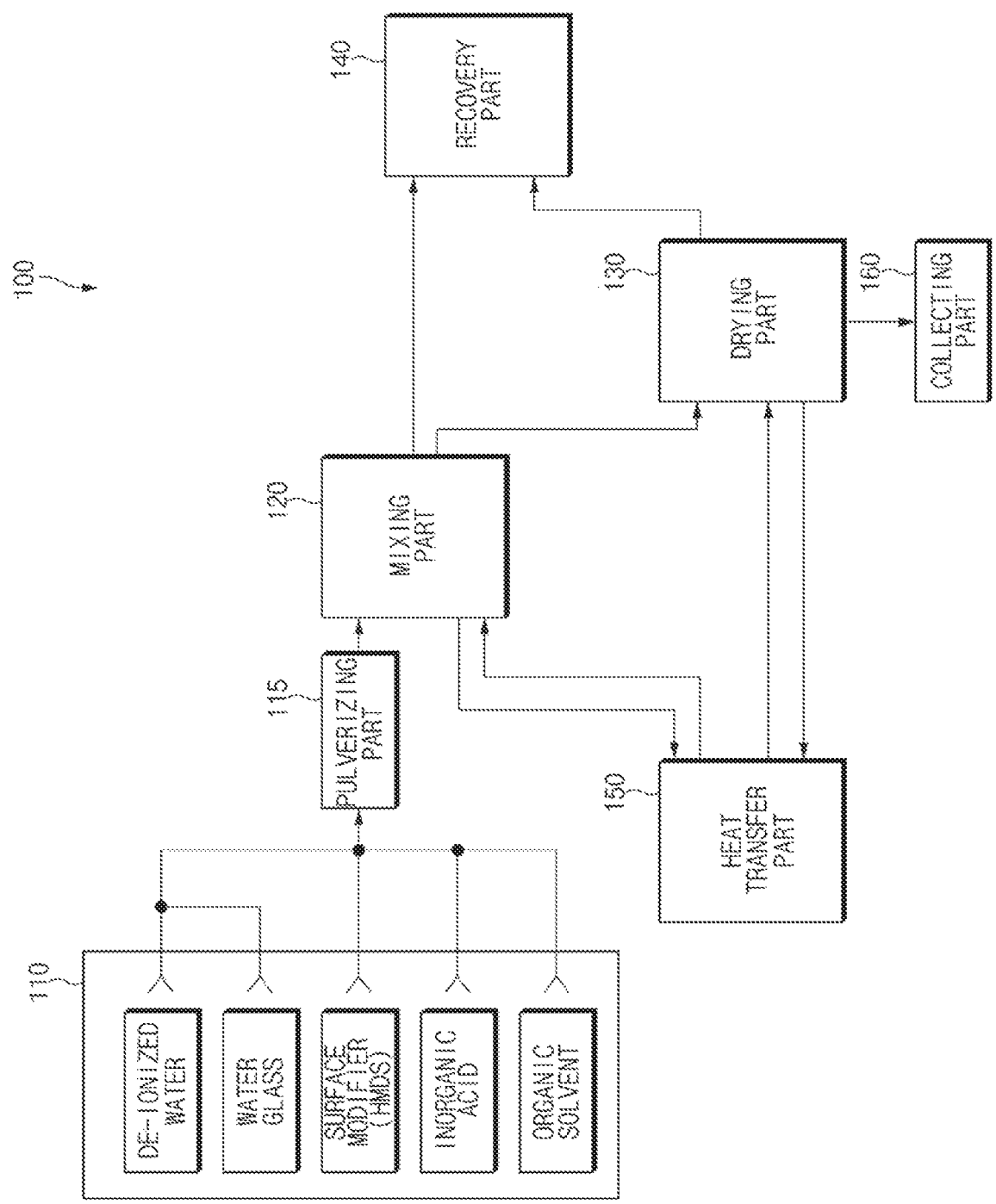

SYSTEM AND ROTATING BLADE UNIT FOR PREPARING SILICA AEROGEL

CROSS-REFERENCE TO RELATED APPLICATION

This application is a National Stage Application of International Application No. PCT/KR2017/002447 filed on Mar. 7, 2017, which claims priority to and the benefit of Korean Patent Application No. 10-2016-0035565, filed on Mar. 24, 2016, both of which are incorporated herein in their entirety by reference for all purposes as if fully set forth herein.

TECHNICAL FIELD

The present invention relates to a system for preparing silica aerogel, and more particularly, to a system for preparing silica aerogel, which increases in production rate of the silica aerogel and is improved in production efficiency or performance.

BACKGROUND ART

Silica aerogel has a chemical formula expressed as $SiO_2 \cdot nH_2O$, high porosity of 90% to 99.9%, and a pore size of 1 nm to 100 nm. The silica aerogel may be a material a high specific surface area with super porosity of 600 m²/g.

Since silica aerogel has a nanoporous structure and a very large surface area, the silica aerogel may have very excellent water and alcohol absorption ability and thus be used as very superior dehumidifying agent and utilized as an ultra light and super thermal insulation material, a catalyst carrier, and a super insulation material.

In spite of a vast range of application, the silica aerogel is extremely limited in use.

The core technology in a process for preparing the silica aerogel is a drying process technology that is capable of drying the wet gel without being contracted while maintaining a structure of the silica wet gel as it is. A representative drying method is a super critical drying process. However, since the super critical drying process has many limitations in terms of economical efficiency and continuity because of using an autoclave that has high production costs and high risks due to a high pressure and is impossible to continuously operate. In addition, there are disadvantages that not only risk factors are comprised in the manufacturing process, but also the manufacturing costs are high due to the complicated manufacturing process.

PRIOR ART DOCUMENTS

Korean Patent Registration No. 10-1082982

DISCLOSURE OF THE INVENTION

Technical Problem

Therefore, the present invention has been made to solve the abovementioned problems, and an object of the present invention is to provide a system for preparing silica aerogel, which increases in production rate of the silica aerogel and is improved in production efficiency or performance.

Technical Solution

A system for preparing silica aerogel according to the present invention comprises a raw material supply part transferring at least one raw material of de-ionized water, water glass, a surface modifier, an inorganic acid, and an organic solvent to a mixing part, the mixing part mixing the raw materials transferred from the raw material supply part to produce silica wet gel, a drying part drying the silica wet gel to produce the silica aerogel, a recovery part recovering a portion of the vaporized raw material of the raw materials used in at least one of the mixing part and the drying part, and a heat transfer part transferring heat to at least one of the mixing part and the drying part, wherein the system further comprises a pulverizing part that pulverizes the raw material from the row material supply part to the mixing part.

Advantageous Effects

The system for preparing the silica aerogel according to the present invention may comprise the raw material supply part, the mixing part, the drying part, the recovery part, and the heat transfer part and further comprise the pulverizing part that pulverizes the raw material transferred from the raw material supply part to the mixing part. Thus, the present invention may provide the system for preparing the silica aerogel, which increases in production rate of the silica aerogel and is improved in production efficiency or performance.

BRIEF DESCRIPTION OF THE DRAWINGS

FIG. 1 is a block diagram illustrating a system for preparing silica aerogel according to an embodiment of the present invention.

MODE FOR CARRYING OUT THE INVENTION

Preferred embodiments of the present invention will be described below in more detail with reference to the accompanying drawings. However, the present invention is not limited to the embodiments below.

FIG. 1 is a block diagram illustrating a system for preparing silica aerogel according to an embodiment of the present invention.

Hereinafter, a system for preparing silica aerogel according to an embodiment of the present invention will be described with reference to FIG. 1.

A system 100 for preparing silica aerogel according to an embodiment of the present invention comprises a raw material supply part 110, a pulverizing part 115, a mixing part 120, a drying part 130, a recovery part 140, and a heat transfer part 150.

Referring to FIG. 1, the raw material supply part 110 may transfer at least one raw material of de-ionized water, water glass, a surface modifier, an inorganic acid, and an organic solvent to the mixing part 120. Only one organic solvent may be used, or two or more organic solvents may be used.

The raw material supply part 110 may mix portions of the raw materials such as the de-ionized water, the water glass, the surface modifier, the inorganic acid, and the organic solvent with each other and transfer the remaining raw materials as they are.

The de-ionized water represents water that is contained in water to remove ions. The water glass is a dark aqueous solution of sodium silicate (liquid phase) obtained by melting silicon dioxide and alkali. The water glass may be obtained by melting a mixture of silica sand and soda ash at a temperature of 1,300° C. to 1,500° C. and then processing the melted mixture in a low pressure steam cooker.

The water glass is not particularly limited, but may contain 28% by weight to 30% by weight of silica ($SiO_2$). Also, a water glass solution may contain 0.1% by weight to 10% by weight of silica.

The de-ionized water and the water glass are stored in corresponding storage containers, respectively. Then, the de-ionized water and the water glass may be transferred from the storage containers to the mixing part 120 through tubes, respectively. When a valve is installed in an intermediate portion of each of the connection tubes, an amount of each of de-ionized water and water glass may be adjusted.

In general, silica wet gel prepared by using the water glass may have a hollow filled with water that is a solvent. The silica wet gel may be referred to as silica hydrogel. However, when the solvent is removed through a drying process, the liquid solvent may be vaporized into a gas phase, to cause contraction and cracks of a porous structure due to high surface tension of the water in a gas/liquid interface. As a result, in the finally prepared silica aerogel, reduction in specific surface area and a change in porous structure occur.

Thus, to maintain the porous structure of the wet gel, it is necessary not only to substitute an organic solvent having relatively low surface tension for the water relatively high surface tension, but also to dry the wet gel without being contracted while maintaining the structure of the wet gel as it is. When the hollow of the silica wet gel is filled with the nonpolar organic solvent, the silica wet gel may be referred to as silica lyogel.

The nonpolar organic solvent may be substituted for the water existing in the hollow of the prepared silica wet gal to prevent construction and cracks of the pores, which occurs during vaporization of the water existing in the hollow of the wet gel when the silica wet gel is dried, from occurring. As a result, the reduction in specific surface area and the change in porous structure, which occur when the silica wet gel is dried, may be prevented from occurring.

The organic solvent may comprise at least one kind selected from the group consisting of hexane, heptane, toluene, and xylene, but is not limited thereto. In more detail, the organic solvent may be hexane.

The dried silica aerogel may maintain low thermal conductivity just after being dried, but a hydrophilic silanol group (Si—OH) existing on a surface of the silica may absorb water in the air to gradually increase in thermal conductivity. Thus, to maintain the low thermal conductivity, it is necessary to modify the surface of the silica aerogel to be hydrophobic.

An organosilicon compound may be used as a surface modifier that is capable of being used when the silica wet gel is prepared. Particularly, a silane-based compound, a siloxane-based compound, a silanol-based compound, or a silazane-based compound may be used as the surface modifier. Here, one kind thereof may be used alone, or a mixture of two or more kinds thereof may be used.

Specific examples of the silane-based compound may comprise dimethyl dimethoxy silane, dimethyl diethoxy silane, methyl trimethoxy silane, vinyl trimethoxy silane, phenyl trimethoxy silane, tetra ethoxy silane, dimethyl dichloro silane, 3-aminopropyl triethoxy silane, and the like.

Specific examples of the siloxane-based compound may comprise polydimethyl siloxane, polydiethyl siloxane, octamethyl cyclotetra siloxane, and the like.

Specific examples of the silanol-based compound may comprise trimethyl silanol, triethyl silanol, triphenyl silanol, t-butyldimethyl silanol, and the like.

Also, specific examples of the silazane compound may comprise 1,2-diethyldisilazane, 1,1,2,2-tetramethyldisilazane, 1,1,3,3-tetramethyl disilazane, hexamethyldisilazane, 1,1,2,2-tetraethyldisilazane, 1,2-diisopropyldisilazane, and the like.

Also, the surface modifier may be a hydrated organosilicon compound. When the hydrated organosilicon compound is used as described above, reactivity with the silica may increase to more effectively perform the surface modification. As a result, hydrophobic silica aerogel having significantly improved tap density characteristic and specific surface area while maintaining excellent hydrophobicity may be prepared.

More particularly, in consideration of the surface modification efficiency and thus the hydrophobicity increasing effect on the silica wet gel, the surface modifier may comprise at least one kind selected from the group consisting of hexamethyldisilazane, tetramethyldisilazane, and, hydrates thereof, and more specifically, hexamethyldisilazane (HMDS).

An inorganic acid usable for preparing the silica wet gel may comprise at least one kind of acid selected from the group consisting of nitric acid, hydrochloric acid, acetic acid, sulfuric acid, and hydrofluoric acid, and particularly, the inorganic acid may be nitric acid ($HNO_3$).

The inorganic acid may rapidly react with the surface modifier to decompose the surface modifier. Thus, reaction between the water glass solution and the surface modifier may be promoted to form surface hydrophobic silica sol. Also, the inorganic acid may promote gelation of the hydrophobic silica sol by adjusting a pH thereof. Thus, the hydrophobic silica wet gel may be prepared by simultaneously inducing the surface modification and the gelation.

The mixing part 120 may mix the raw materials transferred from the raw material supply part 110 to produce the silica wet gel. The mixing part 120 may comprise a motor (not shown) and a mixing tank (not shown). In the mixing tank, the raw materials transferred from the raw material supply part 110 may be mixed by a stirring blade that rotates by the motor. A temperature sensor for measuring a temperature may be provided in the mixing tank. The silica wet gel produced in the mixing part 120 may be transferred to the drying part 130. For this, the mixing part 120 and the drying part 130 may be connected to each other through the tube.

Before describing the drying part 130, the pulverizing part 115 will be described first. Referring to FIG. 1, the system 100 for preparing the silica aerogel according to an embodiment of the present invention may further comprises the pulverizing part 115 that pulverizes the raw materials transferred from the raw material supply part 110 to the mixing part 120.

The pulverizing part 115 may crush or pulverize the raw material particles to produce raw material particles having small sizes. The finer pulverizing of the raw material particles represents that a surface area of the particles to the same volume is widened to more increase a reaction area. When the reaction area to the same volume increases, the surface modification and solvent substitution performance may be more improved. As a result, a production rate of the silica aerogel may increase to improve production efficiency and performance.

The drying part 130 dries the silica wet gel produced in the mixing part 120 to generate the silica aerogel. The drying part 130 may comprise a motor (not shown) and a drying tank (not shown). In the drying tank, the drying of the silica wet gel may be performed by rotation of a stirring blade that rotates by the motor. In this case, the silica aerogel having the form of powder may be produced.

The system 100 for preparing the silica aerogel according to an embodiment of the present invention may further comprise a collecting part 160 that collects the silica aerogel powder produced in the drying part 130.

The drying part 130 and the collecting part 160 may be connected to each other through the tube. Here, a valve may be installed in an intermediate portion of the connection tube. The valve may be controlled in switching to adjust an amount of silica aerogel transferred from the drying part 130 to the collecting part 160.

The recovery part 140 recovers a portion of the vaporized raw material of the raw materials used in at least one of the mixing part 120 and the drying part 130. Particularly, the recovery part 140 may mainly recover the organic solvent vaporized in the mixing part 120 and the drying part 130. The recovery part 140 may comprise a condenser (not shown), a storage tank (not shown), and a vacuum pump (not shown).

The condenser may liquefy the vaporized and recovered raw material, and the storage tank may store the raw material such as the organic solvent liquefied in the condenser. The vacuum pump may be used for controlling a pressure within each of the condenser and the storage tank.

When the organic solvent vaporized while the drying process is performed is recovered by the recovery part 140, a filter may be provided in the drying part 130 so that the silica aerogel powder is not recovered.

The system 100 for preparing the silica aerogel according to an embodiment of the present invention may further comprise the heat transfer part 150 that transfers heat to at least one of the mixing part 120 and the drying part 130. The heat transfer part 150 represents a heater for transferring hot wind to the mixing part 120 and the drying part 130.

The solvent substitution and the gelation performed in the mixing part 120 may be affected by an ambient temperature. Here, it is preferable to perform the solvent substitution and the gelation at an atmosphere of a temperature of 30° C. to 40° C. The heat transfer part 150 may provide a heat medium or hot wind as a medium for heating the mixing part 120.

The drying process performed in the drying part 130 may be affected by a temperature. In general, the drying process may have highest efficiency at room temperature to 150° C. The heat transfer part 150 may also transfer heat to the drying part 130.

The above-described pulverizing part 115 will be described in more detail.

The raw materials transferred from the raw material supply part 110 to the mixing part 120 may be in a state in which solids and liquid are mixed with each other. Alternatively, the raw materials may be in a sol state in which the solids are dispersed in the liquid. Thus, the pulverizing part 115 may perform pulverization by using a homogenizer to allow the mixed raw material to be smaller and more uniform. Here, the homogenizer may be a device that strongly stirs two liquid matters, which do not dissolved with respect to each other, to form emulsion.

In the system 100 for preparing the silica aerogel according to an embodiment of the present invention, the raw materials transferred to the mixing part 120 may be in the state in which solids and liquid are mixed with each other. In this case, the pulverizing part 115 may pulverize the raw material particles by using a jet mill to produce finer particles.

Here, the jet mill may represent a fine pulverizer which ejects compressed air or water vapor having a predetermined pressure or more from a specific nozzle and suctions the raw materials into a high-speed jet stream to sufficiently accelerate the raw material and thereby to allow the accelerated particles to collide with each other or collide with an impaction plate, thereby pulverizing the particles.

The pulverizing part 115 may further comprise a blade (not shown) for pulverizing the raw material particles. Here, the blade may have a shape standing up to face an upper side. The raw material particles tend to descend by gravity. Thus, when the blade rotates while facing the upper side, the falling particles and the blade may effectively collide with each other. Thus, the blade of the pulverizing part 115 may more intensively pulverize the particles to improve the pulverization performance.

Also, in the system 100 for preparing the silica aerogel according to an embodiment of the present invention, the pulverizing part 115 may comprise a blade unit (not shown) for pulverizing the raw material particles. The blade unit may comprise a plate member (not shown) and a protruding blade member (not shown).

The plate member is disposed under the pulverizing part 115 and has a flat plate shape. Also, the protruding blade member may have a shape of a blade that protrudes upward from a top surface of the plate member.

There may be raw material particles accumulated on the bottom by the gravity. The raw material particles accumulated downward may be accumulated on the plate member that is disposed under the pulverizing part 115.

Thereafter, when the plate member rotates, the protruding blade member protruding upward from the plate member may rotate together with the plate member. Thus, the raw material particles accumulated on the plate member may be more effectively and finely pulverized by the protruding blade member that quickly rotates.

When the raw material particles are accumulated and dense on the top surface of the plate member, the protruding blade member may more intensively and reliably perform the pulverizing operation while passing through the accumulated and dense raw material particles. Thus, the pulverization may be more effectively performed.

As described above, when the pulverizing part 115 finely pulverizes the raw material particles, the reaction surface area ma be widened, and thus, the reaction rate may significantly increase. As a result, the surface modification and solvent substitution performance may be more improved.

Therefore, the production rate of the silica aerogel may increase to significantly improve the production efficiency and performance.

Also, to manufacture a product having desired particle size distribution, the silica aerogel after being dried may be subjected to a milling process and a sieving process (operation of classifying particles by particles sizes through a sieve). When the pulverizing part 115 is provided between the raw material supply part 110 and the mixing part 120 like an embodiment of the present invention, the product having the desired particle size distribution may be produced without performing the milling and sieving processes after the drying, thereby reducing the preparation costs.

While the embodiments of the present invention have been described with reference to the specific embodiments, it will be apparent to those skilled in the art that various changes and modifications may be made without departing from the spirit and scope of the invention as defined in the following claims.

The invention claimed is:

1. A system for preparing silica aerogel, the system comprising:
 a raw material supply part comprising a plurality of storage containers each separately containing a raw material of de-ionized water, water glass, a surface modifier, an inorganic acid, and an organic solvent, and further comprising tubes for transferring each raw material from the raw material supply part to a pulverizer;

the pulverizer comprising:
 a jet mill and an impaction plate, configured so that the jet mill produces a jet stream that accelerates particles of a raw material and directs the accelerated particles to collide with the impaction plate thereby pulverizing the particles;
 a rotating blade unit that reduces particle size and increases a reaction surface area, the rotating blade unit comprising:
  a plate member having a flat plate shape;
  a rotating protruding blade member protruding upward from a top surface of the plate member and rotating with respect to the top surface of the plate member, and
  the rotating blade unit is disposed under the jet mill such that particles exiting the jet mill fall and accumulate by gravity on the top surface of the plate member and the rotating protruding blade member passes through the accumulation of particles of the raw material on the top surface of the plate member to perform a pulverizing operation, and the particles are further pulverized by the rotating protruding blade member as the plate member rotates with the rotating protruding blade member rotating with respect to the top surface of the plate member as the plate member is rotating; and
 a homogenizer configured to mix together two liquids of the raw material supply part that do not dissolve with respect to each other to form an emulsion in which solids comprising the pulverized particles are dispersed;
 a mixer comprising a mixing tank, a stirring blade in the tank and a motor for rotating the stirring blade in the tank for mixing the emulsion of the raw materials transferred from the homogenizer to produce a silica wet gel;
 a dryer connected to the mixer for drying the silica wet gel to produce the silica aerogel in a powder form;
 a recovery unit comprising a condenser attached to the mixer and the dryer for recovering a portion of the organic solvent vaporized in at least one of the mixer and the dryer by liquefying the vaporized organic solvent; and
 a heater for transferring heat or a heated medium to at least one of the mixer and the dryer.

2. The system of claim 1, wherein the inorganic acid is nitric acid ($HNO_3$),
 the organic solvent is hexane, and
 the surface modifier is hexamethyldisilazane (HMDS).

3. The system of claim 1,
 further comprises a collector comprising a collection tube connected to the dryer and a container that collects the silica aerogel powder.

4. The system of claim 1, further comprising a temperature sensor for measuring a temperature in the mixing tank of the mixer.

5. The system of claim 1, wherein the recovery unit further comprises a storage tank for storing the organic solvent liquefied in the condenser.

6. The system of claim 5, wherein the recovery unit further comprising a vacuum pump for controlling a pressure within each of the condenser and the storage tank.

* * * * *